(12) United States Patent
Youssef et al.

(10) Patent No.: US 11,658,562 B2
(45) Date of Patent: May 23, 2023

(54) LOSSLESS ACTIVE SNUBBER

(71) Applicant: Marotta Controls, Inc., Montville, NJ (US)

(72) Inventors: Joseph Fayez Youssef, Bridgewater, NJ (US); Lev Sorkin, Cranford, NJ (US)

(73) Assignee: Marotta Controls, Inc., Montville, NJ (US)

( * ) Notice: Subject to any disclaimer, the term of this patent is extended or adjusted under 35 U.S.C. 154(b) by 0 days.

(21) Appl. No.: 17/362,011

(22) Filed: Jun. 29, 2021

(65) Prior Publication Data
US 2022/0416650 A1 Dec. 29, 2022

(51) Int. Cl.
*H02M 3/335* (2006.01)
*H02M 1/34* (2007.01)

(52) U.S. Cl.
CPC .......... *H02M 1/342* (2021.05); *H02M 1/348* (2021.05); *H02M 3/33507* (2013.01); *H02M 3/33576* (2013.01)

(58) Field of Classification Search
CPC .. H02M 1/342; H02M 1/348; H02M 3/33507; H02M 3/33576
See application file for complete search history.

(56) References Cited

U.S. PATENT DOCUMENTS

| | | | | |
|---|---|---|---|---|
| 5,828,559 | A * | 10/1998 | Chen | H03K 17/08148 363/56.05 |
| 2015/0055379 | A1* | 2/2015 | Fang | H02M 3/33592 363/21.17 |
| 2016/0294292 | A1* | 10/2016 | Huang | H02M 1/08 |
| 2019/0036446 | A1* | 1/2019 | Yang | H02M 1/34 |

OTHER PUBLICATIONS

Balbayev et al., "A novel regenerative snubber circuit for flyback topology converters", <https://doi.org/10.21595/ive.2020.20898>, Almaty University of Power Engineering and Telecommunications, Almaty, Kazakhstan, 10 pages.

* cited by examiner

*Primary Examiner* — Adolf D Berhane
(74) *Attorney, Agent, or Firm* — Lerner David LLP

(57) ABSTRACT

A system and method for snubbing transformer leakage energy in a power supply having a transformer and a main switch, in which leakage energy is stored in a capacitor as stored leakage energy when the main switch is turned off, and the stored leakage energy is transferred to the transformer through an inductor when the main switch is turned on.

16 Claims, 5 Drawing Sheets

LOSSLESS ACTIVE SNUBBER

BACKGROUND

A snubber circuit is used to suppress transients in electrical systems. In many applications a snubber provides a short-term alternative current path around a switching device, such alternative path preventing the voltage generated across the device from exceeding the voltage that the device can tolerate. For example, snubbers are often used in electrical systems having an inductive load, such as power supply having a flyback converter topology, in which a sudden interruption of current flow leads to a sharp rise in voltage across the current switching device. A common type of snubber used in a flyback converter power supply is a resistor-capacitor-diode (RCD) snubber.

FIG. 1 is a circuit diagram of a flyback converter power supply coupled to a load 15 and employing an RCD snubber circuit 20. As can be seen from the figure, the power supply includes a power source 25, a transformer 30 having a primary winding 35 and a secondary winding 40, an output diode 45, an output capacitor 50, and a metal oxide semiconductor field effect transistor (MOSFET) 55. The power source 25 may be a voltage supply, Vs, as shown. The transformer's primary winding 35 has an inductance L1 and the transformer's secondary winding 40 has an inductance of L2. If the transformer 30 was an ideal transformer the magnetic linkage between the primary winding 35 and the secondary winding 40 would be perfect. However, as a real transformer, the transformer 30 is not ideal and there is a leak in the magnetic linkage between the primary winding 35 and the secondary winding 40. The leak in the magnetic linkage is represented by leakage inductance 60 that is in series with the primary winding 35.

Notably, while the leakage inductance 60 is depicted in FIGS. 1-4 as an inductor in series with the primary winding 35, the leakage inductance 60 is not a distinct electrical component, and its depiction as a distinct electrical component is for conceptual purposes only. Accordingly, when the hardware structure of FIGS. 1-4 is considered, the leakage inductance 60 should not be identified as a hardware element within such structure.

In operation, the power supply of FIG. 1 delivers a voltage across load 15 that is proportional to an on-off duty cycle of MOSFET 55. Thus, the voltage delivered to the load 15 is controlled by a signal supplied to the gate of MOSFET 55 which switches MOSFET 55 between the on state (conducting between drain and source) and the off state (not conducting between the drain and source). Such switching, absent RCD snubber circuit 20, gives rise to large voltages at the drain of MOSFET 55, due to the "inductive kick" of leakage inductance 60, which may damage or destroy the MOSFET and generate electromagnetic interference (EMI) in nearby circuits and signals. For example, considering the circuit of FIG. 1 without RCD snubber circuit 20, when MOSFET 55 is in the on state there is current flowing in the primary winding 35, and when MOSFET 55 is switched from the on state to the off state the energy associated with L1 is transferred to the secondary winding 40; however, when MOSFET 55 is switched from the on state to the off state the energy associated with leakage inductance 60 has nowhere to go and gives rise to a large voltage on the drain of MOSFET 55. The large voltage on the drain of MOSFET 55 is avoided by introducing the RCD snubber circuit 20 into the circuit of FIG. 1, as the RCD snubber circuit 20 provides a dissipative path for the energy from the leakage inductance 60.

The RCD snubber circuit 20 clamps the voltage on the drain of MOSFET 55. The RCD snubber circuit 20 includes a snubber diode 65, a snubber capacitor 70, and a resistor 75. In operation, when the voltage on the drain of MOSFET 55 rises, current passes through snubber diode 65 and is dissipated into the resistor 75. Thus, the voltage on the drain of the MOSFET 55 is managed, but at the cost of dissipating energy, thereby reducing the efficiency of the power supply 10. The energy dissipation associated with RCD snubber 20 results in about a 2% reduction in the total power delivered to the load 15. Moreover, the RCD snubber circuit 20 causes the snubber capacitor 70 to retain charge, applying a voltage at the drain of MOSFET 55 at the time of turn-off and resulting in non-zero-voltage switching of the MOSFET 55 at turn-off.

BRIEF SUMMARY

It has been recognized that the drawbacks of prior snubbers such as RCD type snubbers can be overcome by providing for active snubbing. Accordingly, the technology of this disclosure is provided.

In one aspect, the technology provides a method of snubbing transformer leakage energy in a power supply having a transformer and a main switch, the method including storing leakage energy in a capacitor as stored leakage energy when the main switch is turned off; and transferring the stored leakage energy to the transformer through an inductor when the main switch is turned on.

In another aspect, the technology provides a snubber circuit including a first diode having a first diode cathode and a first diode anode; a capacitor having a capacitor first terminal coupled to the first diode cathode, and having a capacitor second terminal; a snubber switch having a snubber switch first terminal coupled to the capacitor first terminal, and having a snubber switch second terminal and a snubber switch control terminal; a second diode having a second diode cathode coupled to the snubber switch second terminal, and a second diode anode coupled to the capacitor second terminal; an inductor having an inductor first terminal coupled to the second diode cathode and the snubber switch second terminal, and having an inductor second terminal; and a third diode having a third diode anode coupled to the inductor second terminal.

In still another aspect, the technology provides a power supply including a snubber circuit comprising a first diode having a first diode cathode and a first diode anode, a capacitor having a capacitor first terminal coupled to the first diode cathode, and having a capacitor second terminal, a snubber switch having a snubber switch first terminal coupled to the capacitor first terminal, and having a snubber switch second terminal and a snubber switch control terminal, a second diode having a second diode cathode coupled to the snubber switch second terminal, and a second diode anode coupled to the capacitor second terminal, an inductor having an inductor first terminal coupled to the second diode cathode and the snubber switch second terminal, and having an inductor second terminal, and a third diode having a third diode anode coupled to the inductor second terminal; a power source having a power source first terminal and a power source second terminal, such that the second diode anode is coupled to the power source first terminal and the third diode cathode is coupled to the power source second terminal; a transformer having a primary first terminal and a primary second terminal, such that the first diode anode is coupled to the primary first terminal and the third diode cathode is coupled to the primary second terminal; and a main switch having a main switch first terminal, a main switch second terminal, and a main switch control terminal, such that the first diode anode is coupled to the main switch first terminal, and the capacitor second terminal is coupled to the main switch second terminal.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
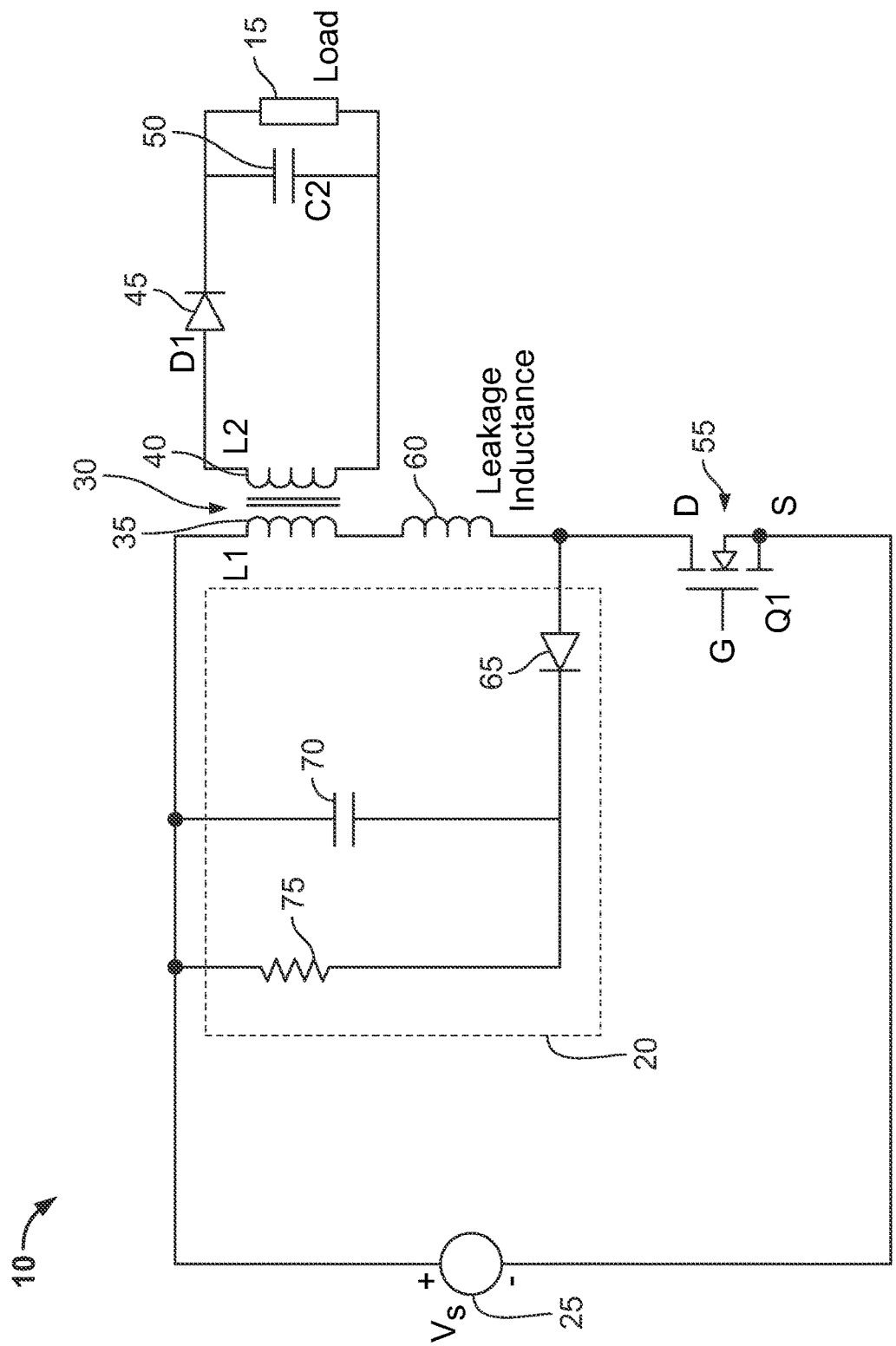
FIG. 1 is a circuit diagram of a power supply and load, the power supply employing an RCD snubber.
Figure 2:
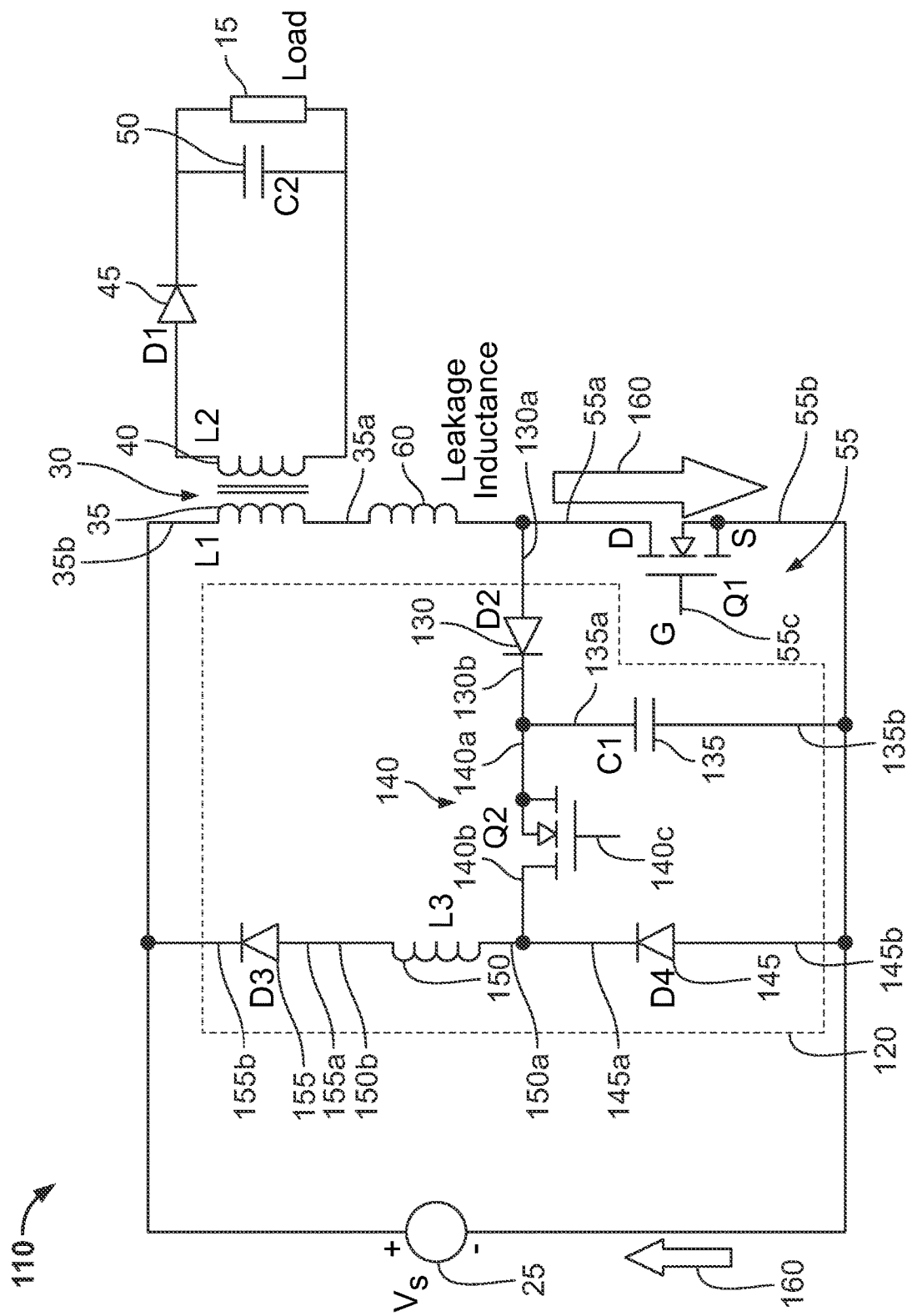
FIG. 2 is a circuit diagram of a power supply and load, the power supply including a snubber according to the present disclosure.

FIG. 2 is a circuit diagram of a flyback converter power supply 110 employing a snubber circuit 120. For ease of comparison, power supply 110 includes the same elements as the power supply 10 of FIG. 1, with the exceptions that the power supply of FIG. 2 includes snubber circuit 120 instead of RCD snubber circuit 20. Also, for purposes of comparison, the power supply 110 of FIG. 2 is shown as coupled to the same load, load 15, as the power supply 10 of FIG. 1.

The snubber circuit 120 of FIG. 2 includes first diode 130, a snubber capacitor 135, a snubber switch 140, a second diode 145, a snubber inductor 150, and a third diode 155. The first diode 130 has a first diode cathode 130*b* that is coupled to the snubber capacitor 135 at a snubber capacitor first terminal 135*a*. The snubber switch 140 has a snubber switch first terminal 140*a* (e.g., a source) coupled to the snubber capacitor first terminal 135*a* and the first diode cathode 130*b*. The snubber switch 140 has a snubber switch second terminal 140*b* (e.g., a drain) coupled to the second diode 145 at a second diode cathode 145*a* and to the snubber inductor 150 at a first snubber inductor terminal 150*a*. The snubber switch also has snubber switch control terminal 140*c* (e.g., a gate) such that a control signal applied to the snubber switch control terminal 140*c* controls switching of the snubber switch 140 between the on state and the off state.

The snubber circuit 120 is coupled to the remainder of the power supply 110 by coupling a first diode anode 130*a* of the first diode 130 to a main switch first terminal 55*a* (e.g., a drain) of MOSFET 55 and a primary first terminal 35*a* of primary winding 35 of transformer 30, coupling a snubber capacitor second terminal 135*b* of the snubber capacitor 135 to a main switch second terminal 55*b* (e.g., a source) of MOSFET 55, coupling a second diode anode 145*b* of the second diode 145 to the snubber capacitor second terminal 135*b* and the main switch second terminal 55*b* of MOSFET 55, and coupling a third diode cathode 155*b* of third diode 155 to a primary second terminal 35*b* of the primary winding 35 of transformer 30.

As can be seen from FIG. 2, the snubber switch 140 takes the form of a MOSFET. However, the presently disclosed technology is not limited to the snubber switch 140 taking the form of a MOSFET, and the snubber switch 140 may take a wide range of alternative forms. Similarly, the presently disclosed technology is not limited to the main switch 55 taking the form of a MOSFET, and the main switch 55 may take a wide range of alternative forms. The wide range of alternative forms for the snubber switch 140 and main switch 55 will be readily apparent in view of this disclosure.

Having described the structure of the circuit of FIG. 2, the operation of the circuit will now be described with a focus on the snubbing of transients caused by the switching of MOSFET 55.

The power supply 110 of FIG. 2 delivers a voltage across load 15 that is proportional to an on-off duty cycle of MOSFET 55. Accordingly, the voltage delivered across load 15 is controlled by a control signal applied to a main switch control terminal 55*c* (e.g., a gate) of MOSFET 55. In an embodiment, when the control signal is high MOSFET 55 is in the on state and a low impedance conduction path is formed between the drain of MOSFET 55 and the source of MOSFET 55. Since the conduction path between the drain of MOSFET 55 and the source of MOSFET 55 has a much lower impedance than the conduction path through first diode 130, current from transformer 30 passes through MOSFET 55 and not through snubber circuit 120. The flow of current when MOSFET 55 is in the on position is shown by arrows 160.

The operation of the circuit of FIG. 2 will now be described with reference to FIGS. 3A to 3D. FIGS. 3A to 3D are circuit diagrams showing current flow directions at various times during the operation of the power supply 110. FIGS. 3A to 3D depict power supply 110 apart from load 15 and include arrows to show the current flow directions.

Figure 3A:
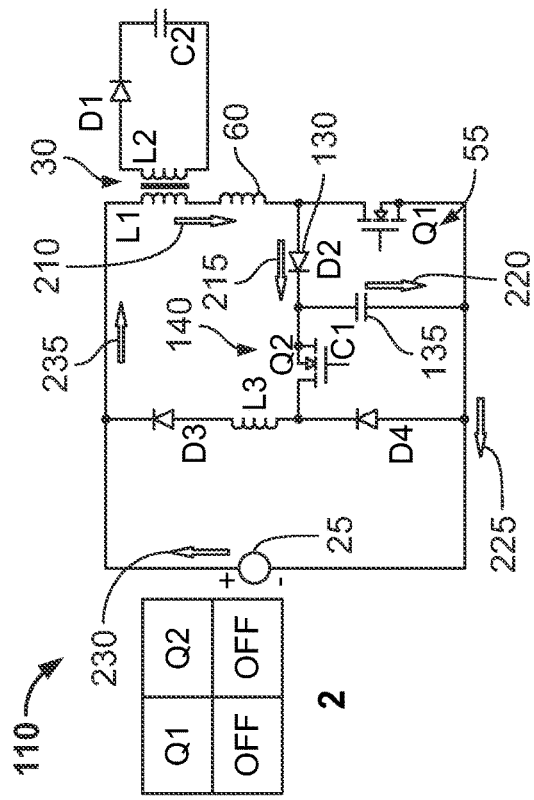
FIGS. 3A-3D are circuit diagrams showing current flows at various time during the operation of the power supply of FIG. 2.
Figure 3B:
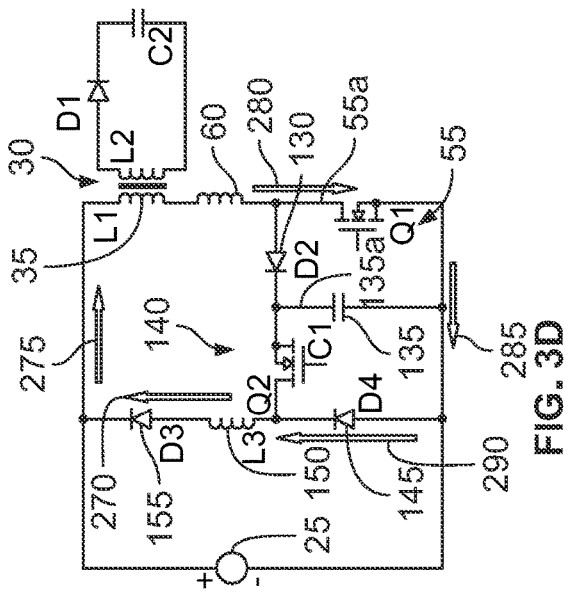
Figure 3C:
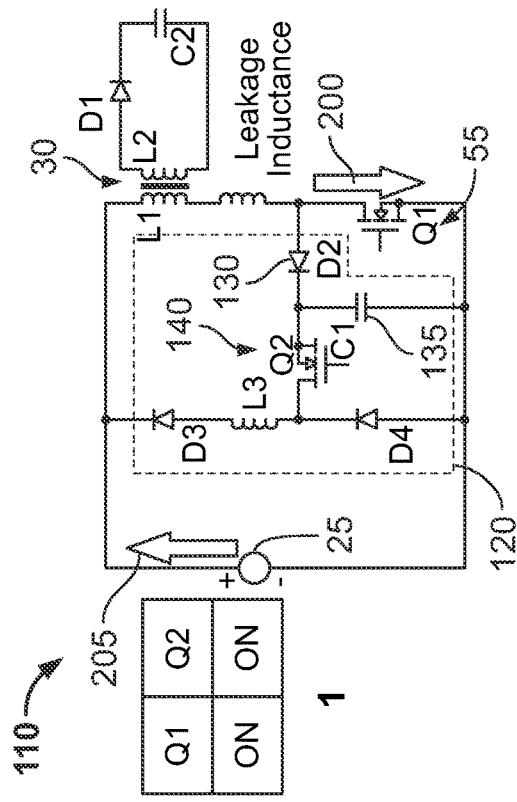
Figure 3D:
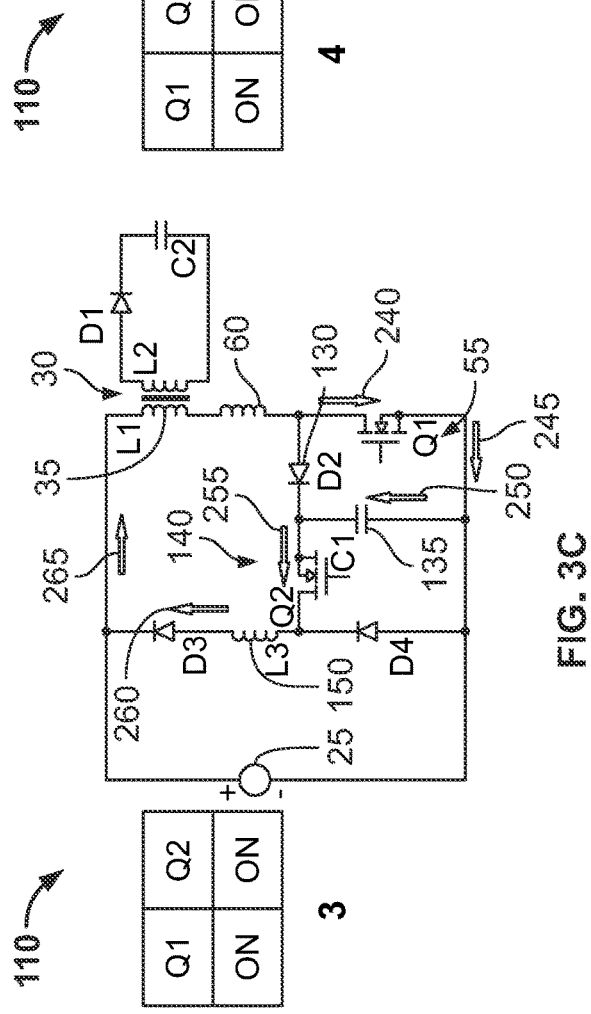

As illustrated in FIGS. 3A through 3D, the main switch (MOSFET) 55 and the snubber switch (MOSFET) 140 are maintained in the same state and are switched at the same time. FIG. 3A shows an initial state of power supply 110 when MOSFETs 55 and 140 are in the on state; namely, when a control signal applied to the gate of MOSFET 55 causes conduction between the drain and source of MOSFET 55. The arrows in FIG. 3A show only the path of the main current flow, showing the charging flow of transformer 30 and ignoring the current path of the snubber circuit 120. FIG. 3B shows a state of power supply 110 after switching from the FIG. 3A state to a state in which MOSFETs 55 and 140 are both in the off state. FIG. 3B shows a state in which leakage energy from transformer 30 transfers to snubber capacitor 135. FIG. 3C shows a state of power supply 110 immediately following switching of both MOSFETs 55 and 140 to their on states from their off states of FIG. 3B. FIG. 3C depicts energy stored in snubber capacitor 135 transferring to transformer 30 through snubber inductor 150. FIG. 3D shows the state of power supply 110 after the MOSFETs 55 and 140 have remained in the on state following the switching transition of FIG. 3B to FIG. 3C. In the FIG. 3D state, all of the energy that was stored in the snubber capacitor 135 has been transferred, but some energy is still stored in snubber inductor 150 and is transferred from snubber inductor 150 to transformer 30, as shown by the arrows of FIG. 3D. After some time, the energy stored in the snubber inductor 150 is completely transferred to transformer 30 and thus all the leakage energy has been transferred to the transformer 30.

Referring to FIG. 3A, with MOSFETs 55 and 140 in the on state, current flows readily through MOSFET 55 and therefore does not flow into snubber circuit 120 via first diode 130. Such current flow through MOSFET 55 is depicted by arrow 200, with a corresponding current from power source 25 indicated by arrow 205. Under these conditions, the primary winding 35 of transformer 30 is storing energy. However, under these conditions the leakage inductance 60 is also storing energy, and the energy stored in leakage inductance 60 will need to be transferred when MOSFET 55 is switched to the off state.

FIG. 3B shows current flows in power supply 110 when MOSFET 55 is switched off from the on state of FIG. 3A. Further, since MOSFET 55 is off in the FIG. 3B state, MOSFET 140 is also off in the FIG. 3B state. As can be seen from FIG. 3B, following turn off of MOSFETs 55 and 140, leakage energy transfers to snubber capacitor 135 through first diode 130, as depicted by arrows 210 and 215. Further, since MOSFET 140 is off the current flowing through first diode 130 charges the snubber capacitor 135, thereby storing energy on snubber capacitor 135, as shown by arrow 220. The capacitive current flow from the snubber capacitor 135 and through power source 25 is depicted by arrows 225, 230, and 235.

When MOSFETs 55 and 140 are both switched from the off states of FIG. 3B to on states, the current flows change to those shown in FIG. 3C. As can be seen from FIG. 3C, MOSFET 55 in the on state allows current to flow readily through MOSFET 55 rather than through first diode 130, as shown by arrows 240 and 245, with the primary winding 35 of transformer 30 and the leakage inductance 60 storing energy. In addition, since MOSFET 140 is on, current flows readily through MOSFET 140, allowing snubber capacitor 135 to discharge through MOSFET 140, as shown by arrows 250 and 255. Thus, the current flowing from snubber capacitor 135 flows through the snubber inductor 150, as shown by arrows 260 and 265, and in turn, through the primary winding 35 of the transformer 30. In this manner, the energy from leakage inductance 60 that was stored on snubber capacitor 135 when MOSFET 55 was switched from on to off is transferred to the snubber inductor 150 and the primary winding 35 when MOSFET 55 is turned back on.

FIG. 3D shows the state of power supply 110 after the MOSFETs 55 and 140 have remained in the on state following the switching transition of FIG. 3B to FIG. 3C and the snubber capacitor 135 has completely discharged. As can be seen from FIG. 3D, once the snubber capacitor 135 is fully discharged, current continues to flow out of the snubber inductor 150, as indicated by arrow 270, and circulates through the third diode 155, the primary winding 35 of the transformer 30, the leakage inductance 60, MOSFET 55, and the second diode 145, as shown by arrows 275, 280, 285, and 290. In time, the current through snubber inductor 150 reaches zero and the energy in the snubber inductor 150 has been transferred to the transformer 30.

By storing energy from leakage inductance 60 into the snubber capacitor 135 and then transferring the energy stored in the snubber capacitor 135 back to the transformer 30, the presently disclosed technology provides lossless snubbing. In a comparative example, the RCD snubber 20 of FIG. 1 dissipates the energy associated with the leakage inductance 60 when MOSFET 55 is switched from on to off, whereas the snubber circuit 120 stores such energy when MOSFET 55 is switched from on to off and delivers the stored energy back to the transformer 30 when the MOSFET 55 is turned back on.

In addition, inclusion of the snubber circuit 120 in power supply 110 provides for zero-voltage switching of MOSFET 55 when MOSFET 55 is switched from on to off. To illustrate, reference is made to FIGS. 3B to 3D. When MOSFET 55 is turned on, MOSFET 140 is turned on and the snubber capacitor 135 discharges until it is fully discharged, and therefore when MOSFET 55 is subsequently turned off current is essentially free to flow through the first diode 130 onto snubber capacitor 135 so that there is zero-voltage at the main switch first terminal 55a (e.g., a drain) at the time of turn off.

By providing zero-voltage switching of MOSFET 55 when MOSFET 55 is switched from on to off, the presently disclosed technology reduces the switching stress on MOSFET 55 (i.e., the main switch).

Figure 4:
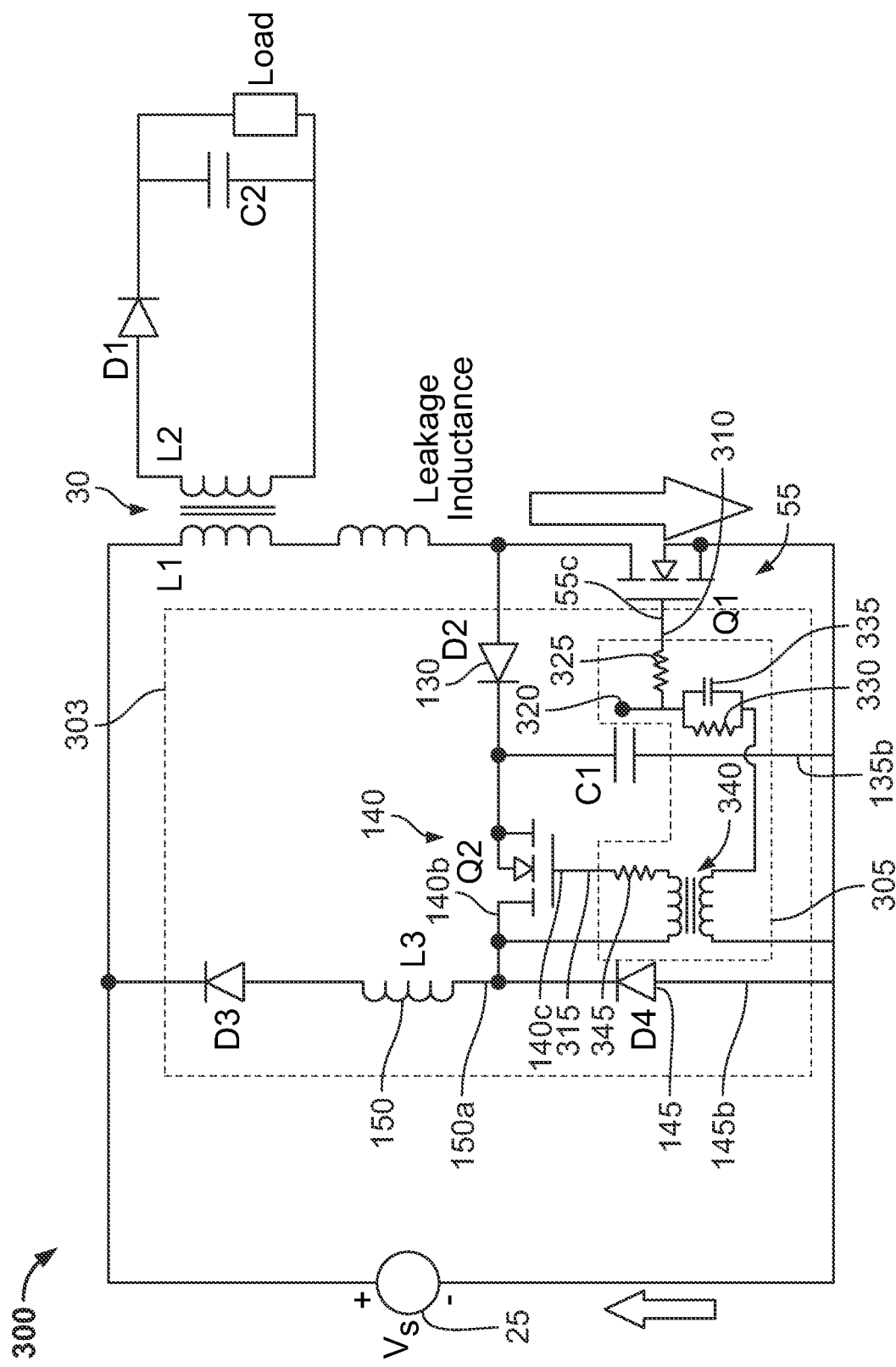
FIG. 4 is a circuit diagram of a power supply and load, the power supply including an alternative snubber according to the present disclosure.

Turning now to FIG. 4, control of the switching of the main switch 55 and snubber switch 140 will be discussed in more detail. In FIG. 4, as in many possible embodiments, a single control signal controls the switching of both the main switch 55 and snubber switch 140, and therefore provides for simple and efficient control of the main switch 55 and snubber switch 140. In the FIG. 4 embodiment, a power supply 300 includes a snubber circuit 303 having control signal circuitry 305 for supplying a main switch control signal 310 and a snubber switch control signal 315. The power supply 300 is the same as the power supply 110 of FIG. 2 except for the substitution of the snubber circuit 303 for the snubber circuit 120, with the snubber circuit 303 being the same as the snubber circuit 120 except for the inclusion of control signal circuitry 305. The control signal circuitry 305 supplies the first control signal 310 to the gate of MOSFET 55 (i.e., to the main switch control terminal 55c of the main switch 55) and supplies the snubber switch control signal 315 to the gate of MOSFET 140 (i.e., to the snubber switch control terminal 140c of the snubber switch 140). The control signal circuity 305 includes a master control signal terminal 320, a first control resistor 325, a second control resistor 330, a control capacitor 335, a control transformer 340, and a third control resistor 345.

It should be noted that the control signal circuitry 305 of FIG. 4 is present in only one possible embodiment of the presently disclosed technology. The wide range of alternatives to control signal circuitry 305 will be readily appreciated upon review of the present disclosure.

Figure 5:
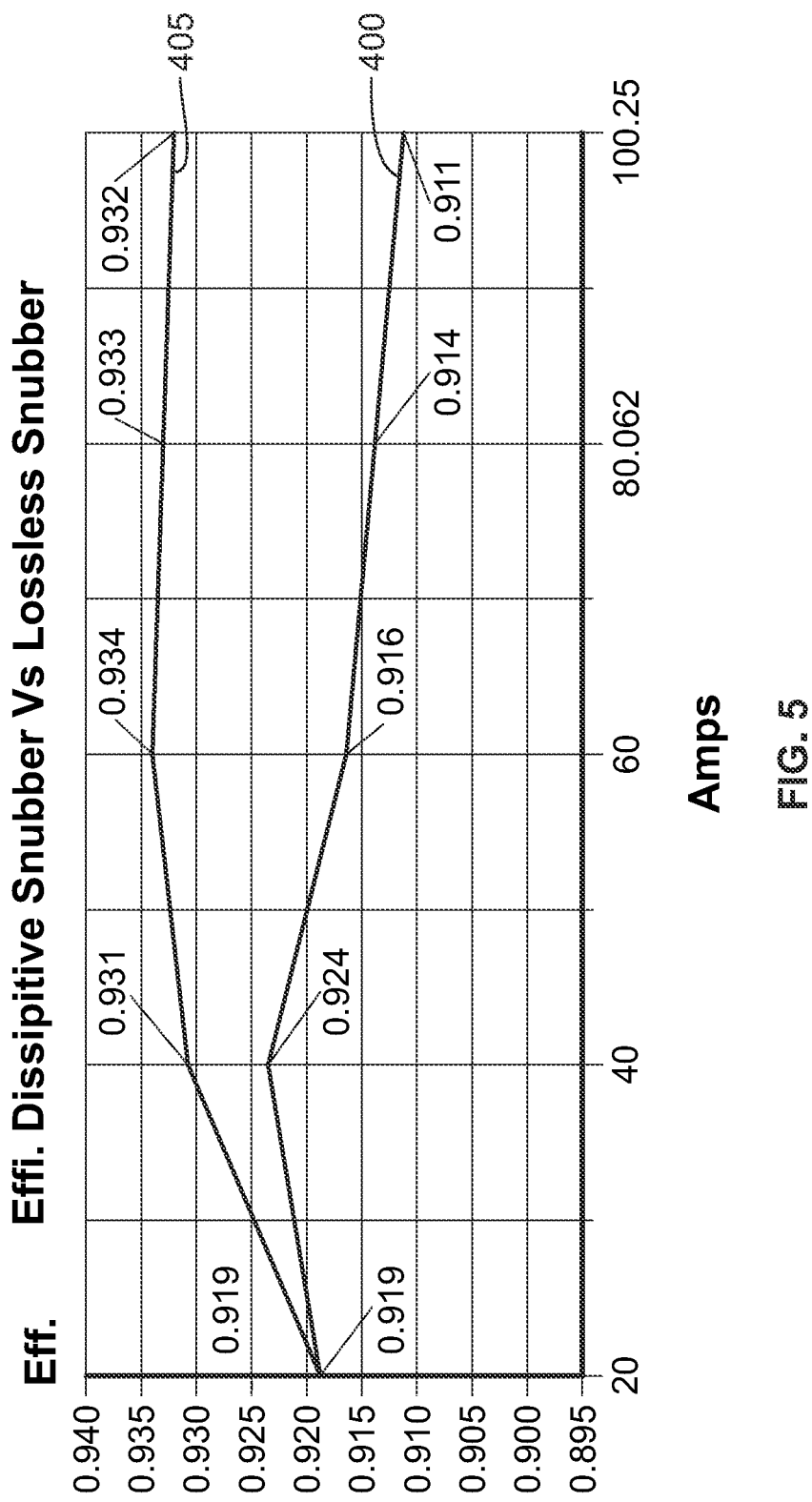
FIG. 5 is a graph showing the efficiency of a power supply with an RCD snubber and the efficiency of a power supply with a snubber according to the present disclosure.

Turning now to FIG. 5, the efficiency of the power supply 10 of FIG. 1 is compared to the efficiency of the power supply 110 of FIG. 2. Further, since the only difference between the power supply 10 of FIG. 1 and the power supply 110 of FIG. 2 is that power supply 10 uses an RCD snubber (i.e., RCD snubber circuit 20) and power supply 110 uses a lossless active snubber (i.e., snubber circuit 120), FIG. 5 is indicative of the relative performance between the RCD snubber circuit 20 and the snubber circuit 120. In particular, FIG. 5 shows a graph in which a first group of connected points 400 corresponds to the performance of RCD snubber circuit 20, and a second group of connected points 405 corresponds to the performance of snubber circuit 120. The horizontal axis of the graph represents the amount of current delivered to load 15 when the voltage across load 15 is 28 volts, and the vertical axis of the graph represents the efficiency as defined by the amount of power delivered to the load 15 relative to the amount of power drawn from power source 25. For example, in reference to points 400, when the current delivered by power supply 10 to load 15 is 60 amps at a load voltage of 28 volts, the output power (60 amps×28 volts, or 1680 watts) divided by the power drawn from power source 25 is 0.916; whereas in reference to points 405, when the current delivered by power supply 110 to load 15 is 60 amps at a load voltage of 28 volts, the output power (60 amps×28 volts, or 1680 watts) divided by the power drawn from power source 25 is 0.934. Thus, in the example power supply efficiency is improved from 0.916 to 0.934 by substituting snubber circuit 120 for snubber circuit 20.

Embodiments of the present technology include, but are not restricted to, the following.

(1) A snubber circuit including a first diode having a first diode cathode and a first diode anode; a capacitor having a capacitor first terminal coupled to the first diode cathode, and having a capacitor second terminal; a snubber switch having a snubber switch first terminal coupled to the capacitor first terminal, and having a snubber switch second terminal and a snubber switch control terminal; a second diode having a second diode cathode coupled to the snubber switch second terminal, and a second diode anode coupled to the capacitor second terminal; an inductor having an inductor first terminal coupled to the second diode cathode and the snubber switch second terminal, and having an inductor second terminal; and a third diode having a third diode anode coupled to the inductor second terminal.

(2) The snubber circuit according to (1), wherein the snubber switch includes a metal oxide semiconductor field effect transistor (MOSFET).

(3) The snubber circuit according to (1), wherein the snubber circuit is configured for coupling to a main switch having a main switch first terminal, a main switch second terminal, and a main switch control terminal, such that the first diode anode is configured for coupling to the main switch first terminal, and the capacitor second terminal is configured for coupling to the main switch second terminal.

(4) The snubber circuit according to (3), wherein the main switch includes a metal oxide semiconductor field effect transistor (MOSFET).

(5) The snubber circuit according to (1), wherein the snubber circuit is configured for coupling to a power source having power source first terminal and a power source second terminal, such that the second diode anode is configured for coupling to the power source first terminal and the third diode cathode is configured for coupling to the power source second terminal.

(6) The snubber circuit according to (1), wherein the snubber circuit is configured for coupling to a transformer having a primary first terminal and a primary second terminal, such that the first diode anode is configured for coupling to the primary first terminal and the third diode cathode is configured for coupling to the primary second terminal.

(7) The snubber circuit according to (1), further including control signal circuitry for supplying a snubber switch control signal to the snubber switch control terminal.

(8) The snubber circuit according to (7), wherein the snubber circuit is configured for coupling to a main switch having a main switch first terminal, a main switch second terminal, and a main switch control terminal, such that the first diode anode is configured for coupling to the main switch first terminal, and the capacitor second terminal is configured for coupling to the main switch second terminal, and wherein the control signal circuitry is configured to supply a main switch control signal to the main switch control terminal.

(9) The snubber circuit according to (7), wherein the control signal circuitry includes a control signal transformer.

(10) The snubber circuit according to (1), wherein the snubber circuit is configured for coupling to a main switch having a main switch first terminal, a main switch second terminal, and a main switch control terminal, such that the first diode anode is configured for coupling to the main switch first terminal, and the capacitor second terminal is configured for coupling to the main switch second terminal, and wherein a snubber switch control signal supplied to the snubber switch control terminal is the same as a main switch control signal supplied to the main switch control terminal.

(11) A power supply including a snubber circuit having a first diode having a first diode cathode and a first diode anode, a capacitor having a capacitor first terminal coupled to the first diode cathode, and having a capacitor second terminal, a snubber switch having a snubber switch first terminal coupled to the capacitor first terminal, and having a snubber switch second terminal and a snubber switch control terminal, a second diode having a second diode cathode coupled to the snubber switch second terminal, and a second diode anode coupled to the capacitor second terminal, an inductor having an inductor first terminal coupled to the second diode cathode and the snubber switch second terminal, and having an inductor second terminal, and a third diode having a third diode anode coupled to the inductor second terminal; a power source having a power source first terminal and a power source second terminal, such that the second diode anode is coupled to the power source first terminal and the third diode cathode is coupled to the power source second terminal; a transformer having a primary first terminal and a primary second terminal, such that the first diode anode is coupled to the primary first terminal and the third diode cathode is coupled to the primary second terminal; and a main switch having a main switch first terminal, a main switch second terminal, and a main switch control terminal, such that the first diode anode is coupled to the main switch first terminal, and the capacitor second terminal is coupled to the main switch second terminal.

(12) The power supply according to (11), wherein the snubber switch includes a metal oxide semiconductor field effect transistor (MOSFET).

(13) The power supply according to (11), wherein the main switch includes a metal oxide semiconductor field effect transistor (MOSFET).

(14) The power supply according to (11), further including control signal circuitry for supplying a main switch control signal to the main switch control terminal.

(15) The power supply circuit according to (11), further including control signal circuitry for supplying a snubber switch control signal to the snubber switch control terminal.

(16) The power supply circuit according to (15), wherein the control signal circuitry includes a control signal transformer.

(17) A method of snubbing transformer leakage energy in a power supply having a transformer and a main switch, the method including storing leakage energy in a capacitor as stored leakage energy when the main switch is turned off;

and transferring the stored leakage energy to the transformer through an inductor when the main switch is turned on.

(18) The method according to (17), wherein the main switch includes a metal oxide semiconductor field effect transistor (MOSFET) having a main switch first terminal, a main switch second terminal, and a main switch control terminal, and the step of storing leakage energy in a capacitor as stored leakage energy when the main switch is turned off includes storing leakage energy in the capacitor as stored leakage energy when a main switch control signal supplied to the main switch control terminal causes the MOSFET to turn off.

(19) The method according to (17), wherein the step of transferring the stored leakage energy to the transformer includes turning on a snubber switch coupling the capacitor to the inductor.

(20) The method according to (19), wherein the snubber switch is metal oxide semiconductor field effect transistor (MOSFET) having a snubber switch first terminal, a snubber switch second terminal, and a snubber switch control terminal, and the step of transferring the stored leakage energy to the transformer includes transferring the stored leakage energy to the transformer when a snubber switch control signal supplied to the snubber switch control terminal causes the MOSFET to turn on.

The invention claimed is:

1. A snubber circuit comprising:
a first diode having a first diode cathode and a first diode anode;
a capacitor having a capacitor first terminal coupled to the first diode cathode, and having a capacitor second terminal;
a snubber switch having a snubber switch first terminal coupled to the capacitor first terminal, and having a snubber switch second terminal and a snubber switch control terminal;
a second diode having a second diode cathode coupled to the snubber switch second terminal, and a second diode anode coupled to the capacitor second terminal;
an inductor having an inductor first terminal coupled to the second diode cathode and the snubber switch second terminal, and having an inductor second terminal; and
a third diode having a third diode anode coupled to the inductor second terminal, the third diode providing a path for transferring energy stored in the capacitor back to an active terminal of a circuit in which the snubber circuit is employed.

2. The snubber circuit according to claim 1, wherein the snubber switch comprises a metal oxide semiconductor field effect transistor (MOSFET).

3. The snubber circuit according to claim 1, wherein the snubber circuit is configured for coupling to a main switch having a main switch first terminal, a main switch second terminal, and a main switch control terminal, such that the first diode anode is configured for coupling to the main switch first terminal, and the capacitor second terminal is configured for coupling to the main switch second terminal.

4. The snubber circuit according to claim 3, wherein the main switch comprises a metal oxide semiconductor field effect transistor (MOSFET).

5. The snubber circuit according to claim 1, wherein the snubber circuit is configured for coupling to a power source having power source first terminal and a power source second terminal, such that the second diode anode is configured for coupling to the power source first terminal and the third diode cathode is configured for coupling to the power source second terminal.

6. The snubber circuit according to claim 1, wherein the snubber circuit is configured for coupling to a transformer having a primary first terminal and a primary second terminal, such that the first diode anode is configured for coupling to the primary first terminal and the third diode cathode is configured for coupling to the primary second terminal.

7. The snubber circuit according to claim 1, further comprising control signal circuitry for supplying a snubber switch control signal to the snubber switch control terminal.

8. The snubber circuit according to claim 7, wherein the snubber circuit is configured for coupling to a main switch having a main switch first terminal, a main switch second terminal, and a main switch control terminal, such that the first diode anode is configured for coupling to the main switch first terminal, and the capacitor second terminal is configured for coupling to the main switch second terminal, and wherein the control signal circuitry is configured to supply a main switch control signal to the main switch control terminal.

9. The snubber circuit according to claim 7, wherein the control signal circuitry comprises a control signal transformer.

10. The snubber circuit according to claim 1, wherein the snubber circuit is configured for coupling to a main switch having a main switch first terminal, a main switch second terminal, and a main switch control terminal, such that the first diode anode is configured for coupling to the main switch first terminal, and the capacitor second terminal is configured for coupling to the main switch second terminal, and wherein a snubber switch control signal supplied to the snubber switch control terminal is the same as a main switch control signal supplied to the main switch control terminal.

11. A power supply comprising:
a snubber circuit comprising
a first diode having a first diode cathode and a first diode anode;
a capacitor having a capacitor first terminal coupled to the first diode cathode, and having a capacitor second terminal;
a snubber switch having a snubber switch first terminal coupled to the capacitor first terminal, and having a snubber switch second terminal and a snubber switch control terminal;
a second diode having a second diode cathode coupled to the snubber switch second terminal, and a second diode anode coupled to the capacitor second terminal;
an inductor having an inductor first terminal coupled to the second diode cathode and the snubber switch second terminal, and having an inductor second terminal; and
a third diode having a third diode anode coupled to the inductor second terminal, the third diode providing a path for transferring energy stored in the capacitor back to an active terminal of a circuit in which the snubber circuit is employed;
a power source having power source first terminal and a power source second terminal, such that the second diode anode is coupled to the power source first terminal and the third diode cathode is coupled to the power source second terminal;
a transformer having a primary first terminal and a primary second terminal, such that the first diode anode is coupled to the primary first terminal and the third diode cathode is coupled to the primary second terminal; and a main switch having a main switch first terminal, a main switch second terminal, and a main switch control terminal, such that the first diode anode is coupled to the main switch first terminal, and the capacitor second terminal is coupled to the main switch second terminal.

12. The power supply according to claim 11, wherein the snubber switch comprises a metal oxide semiconductor field effect transistor (MOSFET).

13. The power supply according to claim 11, wherein the main switch comprises a metal oxide semiconductor field effect transistor (MOSFET).

14. The power supply according to claim 11, further comprising control signal circuitry for supplying a main switch control signal to the main switch control terminal.

15. The power supply circuit according to claim 11, further comprising control signal circuitry for supplying a snubber switch control signal to the snubber switch control terminal.

16. The power supply circuit according to claim 15, wherein the control signal circuitry comprises a control signal transformer.

\* \* \* \* \*